US012794321B2

(12) United States Patent
Sheradin

(10) Patent No.: US 12,794,321 B2
(45) Date of Patent: Nov. 10, 2026

(54) ELECTRIC MACHINE POSITION SENSOR CENTERING APPARATUS COMBINED WITH POWER-TAKE-OFF ACCESSORY

(71) Applicant: Schaeffler Technologies AG & Co. KG, Herzogenaurach (DE)

(72) Inventor: Jacob Sheradin, North Canton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 195 days.

(21) Appl. No.: 18/652,285

(22) Filed: May 1, 2024

(65) Prior Publication Data

US 2025/0343472 A1 Nov. 6, 2025

(51) Int. Cl.

| | |
|---|---|
| ***H02K 11/21*** | (2016.01) |
| ***H02K 7/00*** | (2006.01) |
| ***H02K 7/08*** | (2006.01) |
| ***H02K 7/14*** | (2006.01) |

(52) U.S. Cl.

CPC ............. *H02K 11/21* (2016.01); *H02K 7/003* (2013.01); *H02K 7/085* (2013.01); *H02K 7/14* (2013.01)

(58) Field of Classification Search

CPC ........ H02K 11/21; H02K 7/003; H02K 7/085; H02K 7/14

USPC .......................................... 310/67 R; 290/51

See application file for complete search history.

(56) References Cited

U.S. PATENT DOCUMENTS

| | | | | | |
|---|---|---|---|---|---|
| 1,502,018 | A * | 7/1924 | Chilton | F02N 15/006 | 123/179.29 |
| 1,847,784 | A * | 3/1932 | Rohde | F02N 11/00 | 74/6 |
| 1,965,985 | A * | 7/1934 | Morgan | B60K 17/28 | 464/171 |
| 3,555,315 | A * | 1/1971 | Hunsdorf | H02K 7/108 | 310/67 R |
| 3,577,789 | A * | 5/1971 | Sansam | F16H 37/00 | 74/105 |
| 3,660,671 | A * | 5/1972 | Peterson | H02P 9/08 | 290/40 R |
| 4,259,603 | A * | 3/1981 | Uchiyama | H02K 29/08 | 310/90 |
| 4,405,038 | A * | 9/1983 | Ternehall | B60T 1/087 | 74/15.84 |
| 4,529,901 | A * | 7/1985 | Bartell | H02K 5/1677 | 310/90 |
| 4,836,149 | A * | 6/1989 | Newbold | F02B 57/08 | 123/44 C |
| 5,982,066 | A * | 11/1999 | Marracino | H02K 5/1735 | 310/90 |
| 6,819,068 | B2 * | 11/2004 | Horng | H02K 29/08 | 318/434 |
| 2002/0101081 | A1 * | 8/2002 | Jockel | B60T 1/062 | 290/8 |
| 2010/0237623 | A1 * | 9/2010 | Brown | F03B 13/24 | 405/75 |

(Continued)

*Primary Examiner* — Charles Reid, Jr.

(74) *Attorney, Agent, or Firm* — Suiter Swantz IP

(57) ABSTRACT

A power-take-off accessory may include a rotor position sensor (RPS) rotor which is affixed to the power takeoff rotor and a rotor position sensor stator which is affixed to the power takeoff stator. The arrangement of the rotors and stators of the rotor position sensor and the power takeoff may reduce or eliminate radial movement of the rotor position sensor rotor and the rotor position sensor stator.

20 Claims, 7 Drawing Sheets

300

(56) References Cited

U.S. PATENT DOCUMENTS

| | | | | |
|---|---|---|---|---|
| 2011/0021314 | A1* | 1/2011 | Keeney | F16D 48/066 477/35 |
| 2011/0162466 | A1* | 7/2011 | Hillyer | B60K 17/28 74/11 |
| 2013/0134840 | A1* | 5/2013 | Murata | E02F 9/2075 310/67 R |
| 2013/0154527 | A1* | 6/2013 | Suk | G01D 5/145 318/400.06 |
| 2013/0325207 | A1* | 12/2013 | Gunther | B60L 3/04 903/905 |
| 2021/0016766 | A1* | 1/2021 | Lehmann | B60K 6/387 |
| 2024/0011805 | A1* | 1/2024 | Worofka | G01P 3/44 |

* cited by examiner

100

100

200

200

300

ELECTRIC MACHINE POSITION SENSOR CENTERING APPARATUS COMBINED WITH POWER-TAKE-OFF ACCESSORY

TECHNICAL FIELD

The present disclosure generally relates to electric motors, and more particular to electric motors with position sensing devices.

BACKGROUND

Electric motor rotor position sensors (RPS) are sensitive to mechanical misalignments, such as axial misalignment, radial misalignment, rotary bend, and the like. These misalignments may be static or dynamic based on speed, load, or environmental conditions such as temperature and vibration. Therefore, it would be advantageous to provide a device, system, and method that cures the shortcomings described above.

SUMMARY

A power takeoff (PTO) is described, in accordance with one or more embodiments of the present disclosure. The power takeoff may include: a PTO stator; a PTO rotor, wherein the PTO rotor is configured to rotate relative to the PTO stator about a central axis; a PTO bearing; a PTO shaft, wherein the PTO shaft is affixed to the PTO rotor, wherein the PTO bearing couples between the PTO shaft and the PTO stator; and a rotor position sensor (RPS) including: an RPS stator, wherein the RPS stator is affixed to the PTO stator; and a RPS rotor, wherein the RPS rotor is affixed to the PTO shaft, wherein the RPS rotor is configured to rotate relative to the RPS stator about the central axis, wherein the RPS stator is configured to sense a rotary position of the RPS rotor.

In some aspects, the RPS rotor and the PTO rotor are each affixed to an end of the PTO shaft.

In some aspects, the RPS rotor is affixed to the PTO shaft within an inner diameter of the PTO shaft.

In some aspects, the PTO shaft is configured to axially translate relative to the PTO bearing.

In some aspects, the RPS rotor is configured to axially translate relative to the RPS stator.

In some aspects, the PTO bearing radially constrains the RPS rotor to the PTO stator.

In some aspects, the PTO rotor, the PTO shaft, and the RPS rotor are coaxially aligned.

In some aspects, the PTO rotor, the PTO shaft, and the RPS rotor form a rigid body.

In some aspects, the PTO rotor, the PTO shaft, and the RPS rotor are configured to rotate relative to the PTO stator and the RPS stator.

In some aspects, the PTO rotor, the PTO shaft, and the RPS rotor are configured to axially translate relative to the PTO stator and the RPS stator.

In some aspects, the rotor position sensor is configured to sense a rotary position of the PTO rotor, the PTO shaft, and the RPS rotor.

In some aspects, the power takeoff is an oil-pump PTO, wherein the PTO stator defines an oil-pump outlet, wherein rotation of the PTO rotor causes oil to be pumped from the oil-pump outlet.

An electric motor (EM) is described, in accordance with one or more embodiments of the present disclosure. The electric motor may include: a power takeoff (PTO) including: a PTO stator; a PTO rotor, wherein the PTO rotor is configured to rotate relative to the PTO stator about a central axis; a PTO bearing; a PTO shaft, wherein the PTO shaft is affixed to the PTO rotor, wherein the PTO bearing couples between the PTO shaft and the PTO stator; and a rotor position sensor (RPS) including: an RPS stator, wherein the RPS stator is affixed to the PTO stator; and a RPS rotor, wherein the RPS rotor is affixed to the PTO rotor, wherein the RPS rotor is configured to rotate relative to the RPS stator about the central axis, wherein the RPS stator is configured to sense a rotary position of the RPS rotor; an EM rotor; an EM stator, wherein the EM stator is configured to induce a magnetic field, wherein the magnetic field is configured to cause the EM rotor to rotate relative to the EM stator; a rotor shaft, wherein the PTO shaft is mechanically coupled to the rotor shaft, wherein the EM rotor is affixed to the rotor shaft; an EM flange, wherein the EM flange is affixed to the rotor shaft, wherein the PTO rotor, the RPS rotor, the PTO shaft, the EM rotor, the rotor shaft, and the EM flange are configured to rotate together about the central axis; and an EM housing, wherein the PTO stator and the EM stator are affixed to the EM housing.

In some aspects, an outer radius of the rotor shaft is affixed to an inner radius of the EM rotor.

In some aspects, the PTO rotor, the PTO shaft, and the RPS rotor form a rigid body.

In some aspects, the PTO rotor, the PTO shaft, and the RPS rotor are configured to axially translate relative to the rotor shaft.

In some aspects, the PTO shaft and the EM flange are disposed at opposing ends of the rotor shaft.

In some aspects, the electric motor is a three-phase electric motor.

In some aspects, the electric motor does not include a bearing coupling the EM rotor to the EM stator.

A drive-train system is described, in accordance with one or more embodiments of the present disclosure. The drive-train system may include: an electric motor including: a power takeoff (PTO) including: a PTO stator; a PTO rotor, wherein the PTO rotor is configured to rotate relative to the PTO stator about a central axis; a PTO bearing; a PTO shaft, wherein the PTO shaft is affixed to the PTO rotor, wherein the PTO bearing couples between the PTO rotor and the PTO stator; and a rotor position sensor (RPS) including: an RPS stator, wherein the RPS stator is affixed to the PTO stator; and a RPS rotor, wherein the RPS rotor is affixed to the PTO shaft, wherein the RPS rotor is configured to rotate relative to the RPS stator about the central axis, wherein the RPS stator is configured to sense a rotary position of the RPS rotor; an EM rotor; an EM stator, wherein the EM stator is configured to induce a magnetic field, wherein the magnetic field is configured to cause the EM rotor to rotate relative to the EM stator; a rotor shaft, wherein the PTO shaft is mechanically coupled to the rotor shaft, wherein the EM rotor is affixed to the rotor shaft; an EM flange, wherein the EM flange is affixed to the rotor shaft, wherein the PTO rotor, the RPS rotor, the PTO shaft, the EM rotor, the rotor shaft, and the EM flange are configured to rotate together about the central axis; and an EM housing, wherein the PTO stator and the EM stator are affixed to the EM housing; and an external device (ED) including: an ED flange, wherein the EM flange is affixed to the ED flange; an ED shaft, wherein the ED shaft is affixed to the ED flange, wherein the rotor shaft, the EM flange, the ED flange, and the ED shaft form a rigid body; a plurality of ED bearings; and an ED housing, wherein the EM housing is affixed to the ED housing, wherein the plurality of ED bearings couple between the ED shaft and the ED housing.

BRIEF DESCRIPTION OF THE DRAWINGS

The numerous advantages of the disclosure may be better understood by those skilled in the art by reference to the accompanying figures in which.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for applications or implementations.

Embodiments of the present disclosure are directed to an electric machine position sensor centering apparatus combined with power-take-off accessory. The power-take-off accessory may include a rotor position sensor (RPS) rotor which is affixed to the power takeoff rotor and a rotor position sensor stator which is affixed to the power takeoff stator. The arrangement of the rotors and stators of the rotor position sensor and the power takeoff may reduce or eliminate radial movement of the rotor position sensor rotor and the rotor position sensor stator.

Figure 1A:
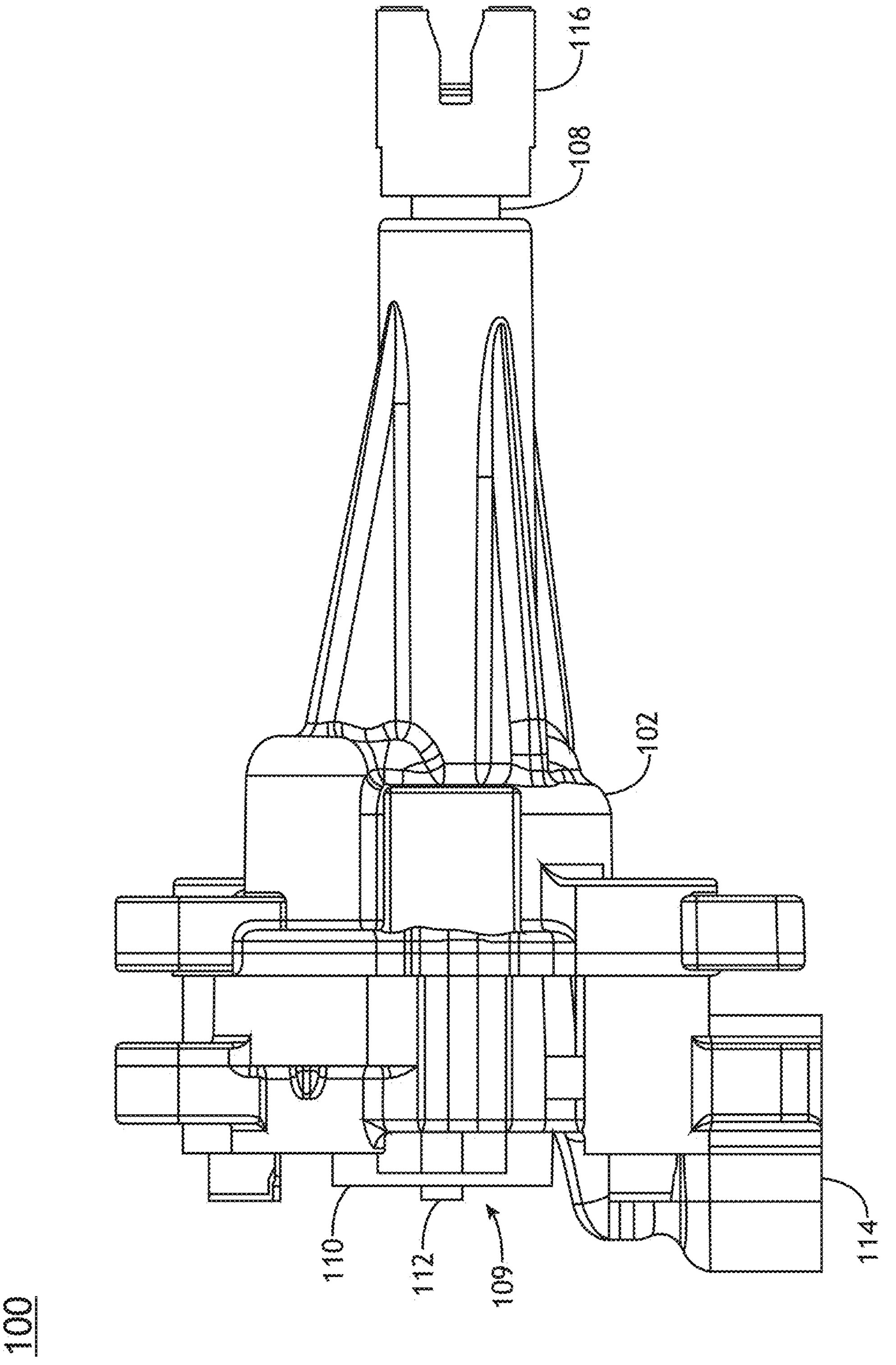
FIG. 1A illustrates a front view of a power takeoff, in accordance with one or more embodiments of the present disclosure.
Figure 1B:
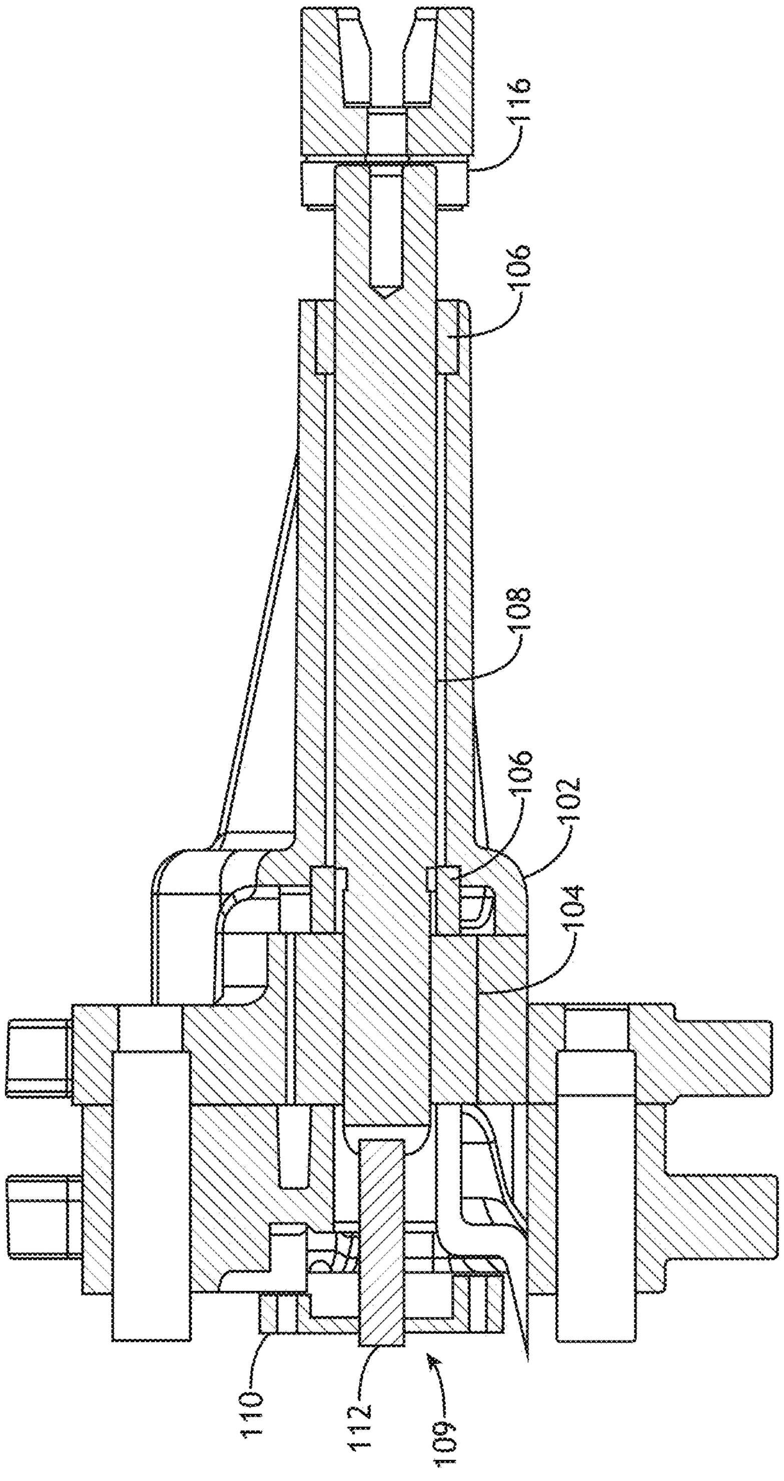
FIG. 1B illustrates a cross-section view of the power takeoff, in accordance with one or more embodiments of the present disclosure.
Figure 1C:
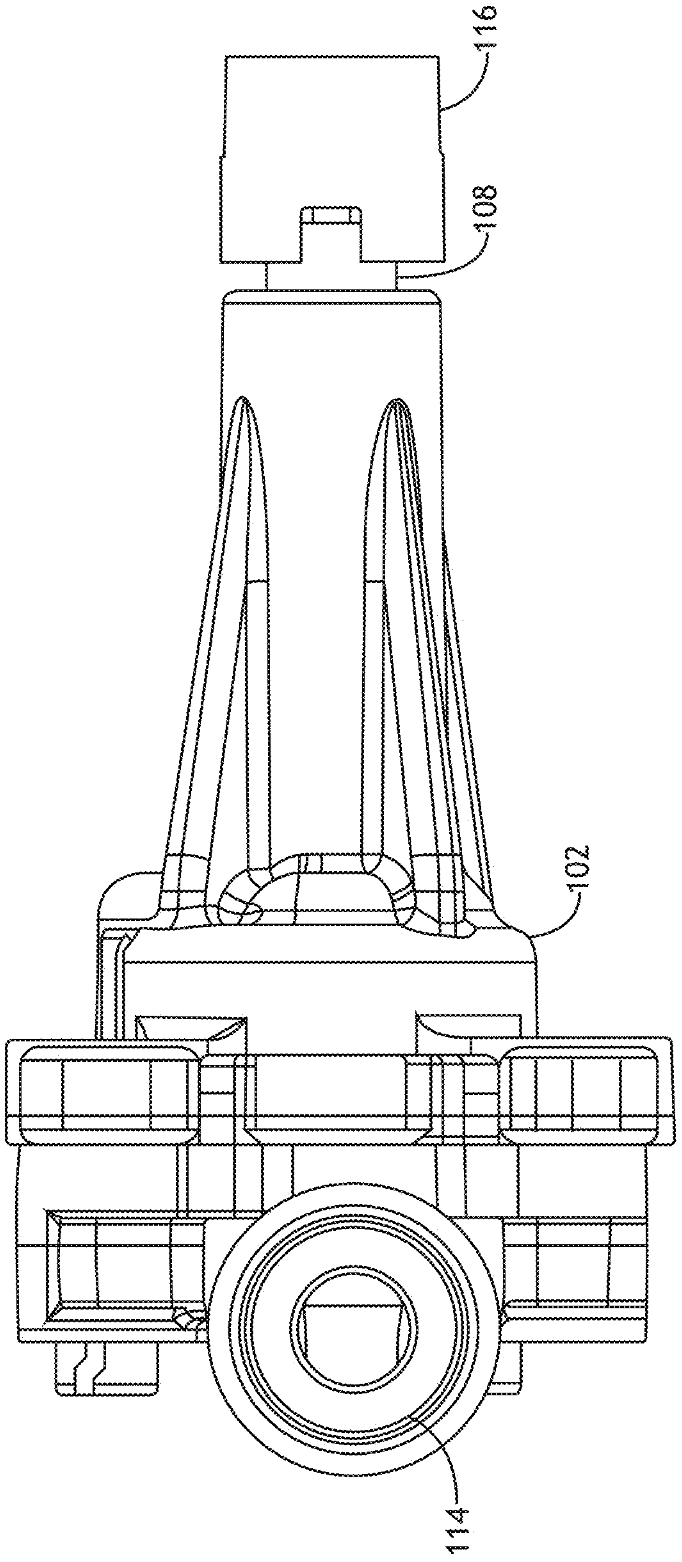
FIG. 1C illustrates a bottom view of the power takeoff, in accordance with one or more embodiments of the present disclosure.

FIGS. 1A-1C illustrates a power takeoff (PTO 100), in accordance with one or more embodiments of the present disclosure. The PTO 100 may include one or more of a PTO stator 102, a PTO rotor 104, a PTO bearing 106, a PTO shaft 108, a rotor position sensor (RPS 109), a RPS stator 110, and/or a RPS rotor 112. The RPS 109 may be combined with the PTO 100.

The PTO stator 102 may be a stator for the PTO rotor 104. The PTO stator 102 may be annular in a circumferential direction.

The PTO rotor 104 may be configured to rotate relative to the PTO stator 102 about a central axis. The PTO rotor 104 may include a rotary vane, or the like, The PTO bearing 106 may couple between the PTO shaft 108 and the PTO stator 102. The PTO bearing 106 may locate the PTO rotor 104 and/or the PTO shaft 108 relative to the PTO stator 102. The PTO bearing 106 may constrain the PTO rotor 104 and/or the PTO shaft 108 to two degrees-of-freedom. The PTO rotor 104 and/or the PTO shaft 108 may be configured to rotate relative to the PTO bearing 106 and/or axially translate relative to the PTO bearing 106. The axial translation may be along the central axis. The PTO bearing 106 may prevent radial translation of the PTO rotor 104 and/or the PTO shaft 108 relative to the PTO bearing 106. The PTO bearing 106 may be a rifle bearing coupled on opposing ends of the PTO shaft 108 between the PTO shaft 108 and the PTO stator 102.

The PTO shaft 108 may be affixed to the PTO rotor 104. The PTO shaft 108 may be affixed to an end of the PTO rotor 104. An outer diameter of the PTO shaft 108 may be affixed to an inner diameter of the PTO rotor 104. The PTO rotor 104 and/or the RPS rotor 112 may be driven via the PTO shaft 108.

The PTO shaft 108 may be a low-lash connection. The PTO shaft 108 may be a continuous-velocity joint, U-joint, beveled spline, wedge fitting, a spring-loaded wedge fitting, a flexible coupling, or the like. For example, the PTO shaft 108 may include shaft end 116. The shaft end 116 may be disposed at the end of the PTO shaft 108 outside of the PTO stator 102. The shaft end 116 may provide the low-lash connection.

The RPS 109 may include the RPS stator 110 and the RPS rotor 112. The RPS 109 may be a variable-reluctance RPS (e.g., a resolver RPS), hall-effect RPS, an eddy current sensor, or the like. The RPS stator 110 may be affixed to the PTO stator 102.

The RPS rotor 112 may be affixed to the PTO shaft 108. The RPS rotor 112 may be affixed to an end of the PTO shaft 108. For example, the RPS rotor 112 may be affixed to the PTO shaft 108 within an inner diameter of the PTO shaft 108. The RPS rotor 112 may be 'end of shaft' type design and the end of PTO shaft 108 may be hollow, thereby defining the inner diameter.

The RPS stator 110 may locate the RPS rotor 112 relative to the RPS stator 110. The RPS stator 110 may constrain the RPS rotor 112 to two degrees-of-freedom relative to the RPS rotor 112. The RPS rotor 112 may be configured to rotate relative to the RPS stator 110 about the central axis and/or axially translate relative to the RPS stator 110. The RPS rotor 112 may prevent radial translation of the RPS stator 110 relative to the RPS rotor 112.

The RPS rotor 112 and the shaft end 116 may be disposed at opposing ends of the PTO shaft 108. The RPS rotor 112 and the PTO rotor 104 may each be affixed to one end of the PTO shaft 108. The PTO rotor 104, the PTO shaft 108, and the RPS rotor 112 may form a rigid body with zero degrees-of-freedom. The PTO rotor 104, the PTO shaft 108, and the RPS rotor 112 may be configured to axially translate and/or rotate as the rigid body.

The PTO rotor 104, the PTO shaft 108, and/or the RPS rotor 112 may be coaxially aligned. The PTO rotor 104, the PTO shaft 108, and/or the RPS rotor 112 may be coaxially aligned along the central axis.

The PTO rotor 104, the PTO shaft 108, and/or the RPS rotor 112 may be configured to rotate relative to the PTO stator 102 and/or the RPS stator 110. The PTO rotor 104, the PTO shaft 108, and/or the RPS rotor 112 may be configured to rotate relative to the PTO stator 102 and/or the RPS stator 110 about the central axis.

The RPS 109 may sense the rotary position of the PTO rotor 104, the PTO shaft 108, and/or the RPS rotor 112. The RPS 109 may sense the rotary position of the PTO rotor 104, the PTO shaft 108, and/or the RPS rotor 112 by sensing the rotary position of the RPS rotor 112 using the RPS stator 110.

The PTO rotor 104, the PTO shaft 108, and/or the RPS rotor 112 may be configured to axially translate relative to the PTO stator 102 and/or the RPS stator 110. The PTO rotor 104, the PTO shaft 108, and/or the RPS rotor 112 may be configured to axially translate relative to the PTO stator 102 and/or the RPS stator 110 along the central axis.

The PTO bearing 106 may radially constrain the RPS rotor 112 to the PTO stator 102. The PTO bearing 106 may radially constrain the RPS rotor 112 via the PTO shaft 108. The PTO bearing 106 may ensure radial alignment of the RPS rotor 112. The PTO bearing 106 may provide adequate alignment for the RPS rotor 112 thereby allowing the RPS 109 to measure the rotary position of the PTO rotor 104, the PTO shaft 108, and the RPS rotor 112.

The PTO 100 may be any PTO accessory, such as, but not limited to, a rotary-vane pump PTO, a positive displacement pump PTO, an oil-pump PTO, a coolant-pump PTO, or the like. For example, the PTO stator 102 may define an oil-pump outlet 114. The rotation of the PTO rotor 104 may cause oil to be pumped from the oil-pump outlet 114.

Figure 2A:
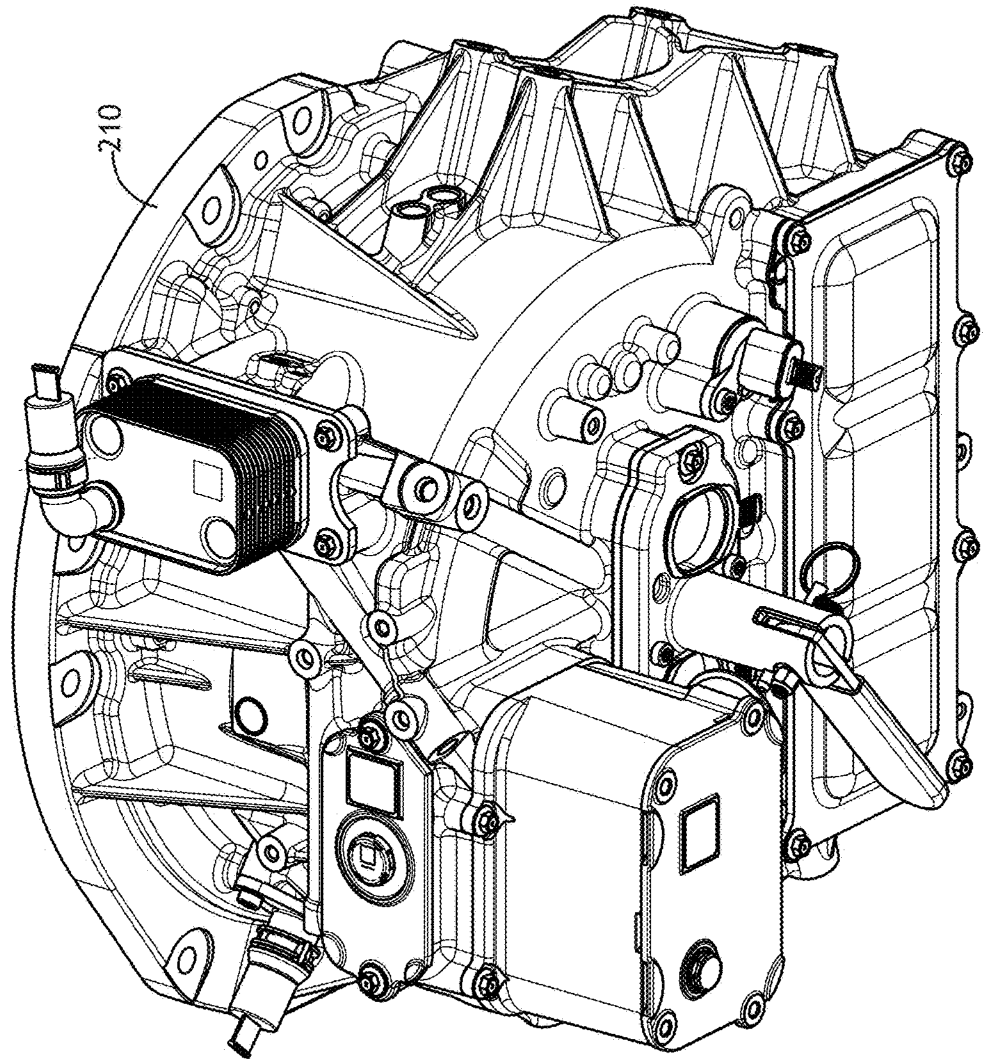
FIG. 2A illustrates a perspective view of an electric motor, in accordance with one or more embodiments of the present disclosure.
Figure 2B:
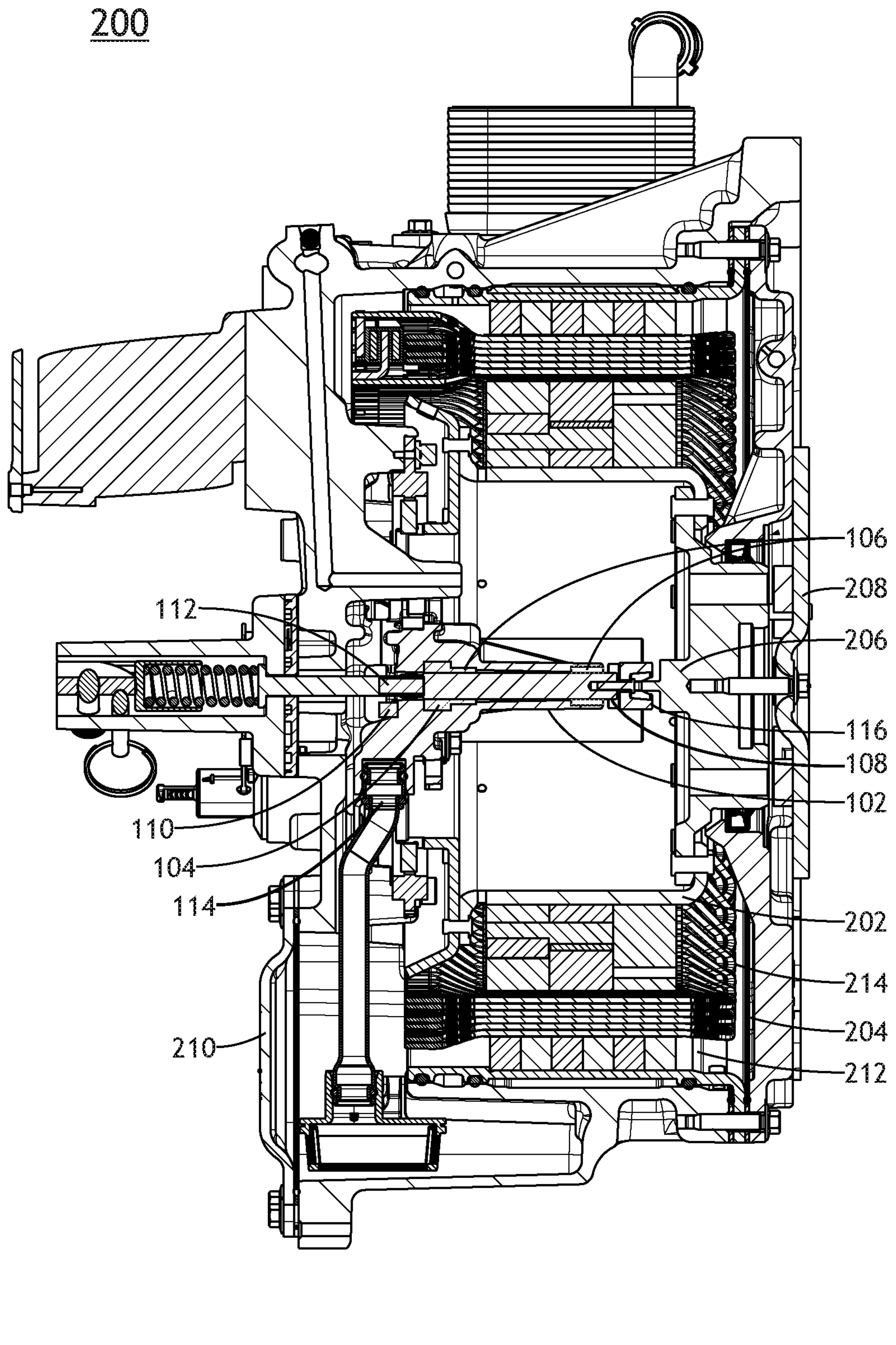
FIG. 2B illustrates a cross-section view of the electric motor, in accordance with one or more embodiments of the present disclosure.
Figure 2C:
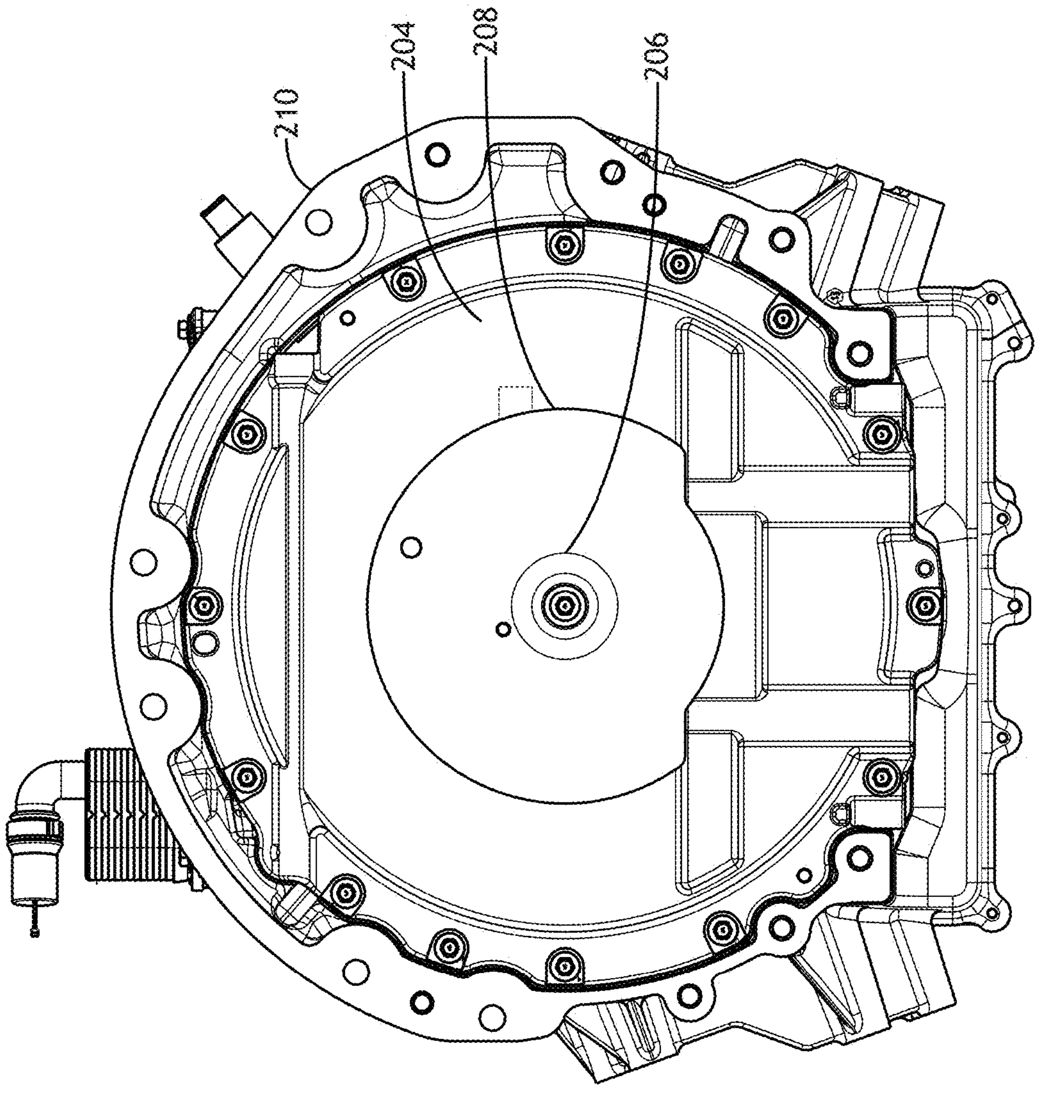
FIG. 2C illustrates a front view of the electric motor, in accordance with one or more embodiments of the present disclosure.

FIGS. 2A-2C illustrate an electric motor 200 (EM), in accordance with one or more embodiments of the present disclosure. The electric motor 200 may be an electric machine assembly. The electric motor 200 may include one or more of the PTO 100, an EM rotor 202, an EM stator 204, a rotor shaft 206, an EM flange 208, and/or an EM housing 210.

The EM stator 204 may include a stator core 212, windings 214, and the like. The stator core 212 may be made of one or more stacks of lamination. The stator core 212 may define slots for the windings 214. The windings 214 may be disposed in the slots defined by the stator core 212. The windings 214 may include hairpin windings (e.g., a hairpin lap winding) or the like. The hairpin windings may be flat bars which may be bent into a select shape. For example, the hairpin windings may include a "U-shape" or the like.

The EM stator 204 may be configured to induce a magnetic field. The magnetic field may cause the EM rotor 202 to rotate relative to the EM stator 204. The EM rotor 202 may perform work on one or more external components via the rotation. Thus, the electric motor 200 may be a dynamo-electric machine which converts electrical energy to mechanical energy by electromagnetic means.

The electric motor 200 may be a three-phase electric motor. The three-phase electric motor may carry three phases of current, including first-phase (u), second-phase (v), and third-phase (w). The windings 214 may carry a respective of the phases to define poles of the magnetic field. For example, the windings 214 may include first-phase windings, second-phase windings, and third-phase windings. The first-phase windings, second-phase windings, and third-phase windings may be arranged in an alternating arrangement. The windings 214 may form a "wye" transformer or the like. The electric motor 200 may include one or more of the first-phase windings, second-phase windings, and third-phase windings per pole-group. The EM stator 204 may include a select number of layers of the windings 214. For example, the EM stator 204 may include a two-layer winding, a four-layer winding, and the like.

The PTO shaft 108 may be mechanically coupled to the rotor shaft 206. For example, an end of the PTO shaft 108 may be mechanically coupled to an end of the rotor shaft 206. The end of the PTO shaft 108 may extend beyond the EM rotor 202 and mechanically couple to the rotor shaft 206. For example, the shaft end 116 of the PTO shaft 108 may mechanically couple to the rotor shaft 206. The PTO shaft 108 may allow axial misalignment between the PTO shaft and the rotor shaft 206. For example, the PTO rotor 104, the PTO shaft 108, and/or the RPS rotor 112 may be configured to axially translate relative to the rotor shaft 206. Thus, the PTO rotor 104, the PTO shaft 108, and/or the RPS rotor 112 may not form a rigid body with the rotor shaft 206. The PTO shaft 108 may be a low-lash connection to the rotor shaft 206 that is tolerant of misalignment.

The PTO shaft 108 may allow an amount of radial offset between the PTO shaft 108 and the rotor shaft 206. The radial offset between the PTO shaft 108 and the rotor shaft 206 may be minimal. For example, the PTO shaft 108 may move radially relative to the rotor shaft 206 by up to one millimeter. The PTO rotor 104, the PTO shaft 108, and/or the RPS rotor 112 may be configured to radially translate relative to the rotor shaft 206.

The EM rotor 202 may be affixed to the rotor shaft 206. For example, an outer radius of the rotor shaft 206 may be affixed to the EM rotor 202.

The EM flange 208 may be affixed to the rotor shaft 206. For example, the PTO shaft 108 and the EM flange 208 may be disposed at opposing ends of the rotor shaft 206. The EM rotor 202, the rotor shaft 206, and the EM flange 208 may form a rigid body.

The PTO rotor 104, the PTO shaft 108, the RPS rotor 112, the EM rotor 202, the rotor shaft 206, and/or the EM flange 208 may rotate together about the central axis.

The EM rotor 202 may or may not be supported by the EM stator 204 via one or more bearings. For example, the EM rotor 202 may not be supported by the EM stator 204. The design of the electric motor 200 may not permit the use of bearings for supporting the EM rotor 202 by the EM stator 204. The electric motor 200 may not include bearings coupling the EM rotor 202 to the EM stator 204. Additionally, the EM rotor 202 and the rotor shaft 206 may not be supported by PTO bearings 106 through the PTO shaft 108. For example, the EM rotor 202 and the rotor shaft 206 may not be supported by PTO bearings 106 through the PTO shaft 108 due to the low-lash connection.

The electric motor 200 may be a hybrid module, a P2 electric motor, or the like. The PTO shaft 108 may be driven by both the EM rotor 202 and the rotor shaft 206. The EM rotor 202 may drive the PTO shaft 108, through the rotor shaft 206, via the electromagnetic field generated by the EM stator 204 and the rotor shaft 206 may drive the PTO shaft 108 via a coupling with an external device through the EM flange 208.

The PTO rotor 104, the RPS rotor 112, the PTO shaft 108, the EM rotor 202, the rotor shaft 206, and/or the EM flange 208 may be configured to rotate together about the central axis. The PTO rotor 104, the RPS rotor 112, the PTO shaft 108, the EM rotor 202, the rotor shaft 206, and/or the EM flange 208 may be configured to rotate at a same revolutions per minute (RPM). Thus, there may be a direct correlation between rotations along the length of the PTO rotor 104, the RPS rotor 112, the PTO shaft 108, the EM rotor 202, the rotor shaft 206, and/or the EM flange 208.

The rotor shaft 206 may be a stamped piece of steel in the shape of bell. A rotor laminate may be shrink fit around the rotor shaft 206. A front of the bell may include the EM flange 208.

The EM rotor 202 may be disposed within a central axis of the EM stator 204. The PTO rotor 104, the PTO shaft 108, the RPS rotor 112, the EM rotor 202, the rotor shaft 206, and/or the EM flange 208 may be coaxially aligned. For example, the PTO rotor 104, the PTO shaft 108, the RPS rotor 112, the EM rotor 202, the rotor shaft 206, and/or the EM flange 208 may be coaxially aligned along the central axis of the EM stator 204.

The EM housing 210 may house one or more components of the electric motor 200. The PTO 100, the EM rotor 202, the EM stator 204, the rotor shaft 206, and/or the EM flange 208 may be housed in the EM housing 210. The PTO stator 102 and/or the EM stator 204 may be affixed to the EM housing 210. The RPS stator 110 may be affixed to the EM housing 210 through the PTO stator 102. Thus, the EM housing 210 may prevent radially misalignment of the PTO stator 102.

The RPS 109 may determine the rotary position of the PTO rotor 104, the PTO shaft 108, the RPS rotor 112, and/or the EM rotor 202.

The electric motor 200 may be a synchronous motor. The EM stator 204 may generate the poles of the magnetic field in synchronization with the rotation of the EM rotor 202. The rotary position of the PTO rotor 104, the PTO shaft 108, the RPS rotor 112, and/or the EM rotor 202 may be used as feedback for controlling the EM stator 204. The electric motor 200 may receive the rotary position of the PTO rotor 104, the PTO shaft 108, the RPS rotor 112, and/or the EM rotor 202 from the RPS 109 and use the rotary position to generate the poles of the magnetic field in synchronization with the rotation of the EM rotor 202. For example, the rotary position of the EM rotor 202 may be used to control a frequency and/or phase of current through the EM stator 204 to match the poles to the rotary position.

Affixing the RPS rotor 112 to the PTO shaft 108 and/or affixing the RPS stator 110 to the PTO stator 102 may prevent radial misalignment of the RPS rotor 112 relative to the RPS stator 110. Preventing the radial misalignment may be desirable to ensure the rotary position of the PTO rotor 104, the PTO shaft 108, the RPS rotor 112, and/or the EM rotor 202 is generated accurately by the RPS 109 and/or to ensure the poles of the magnetic field generated by the EM stator 204 is in synchronization with the rotation of the EM rotor 202 based on the rotary position sensed by the RPS 109. The RPS 109 may not include the radial misalignment even where the radial offset occurs between PTO rotor 104 and the EM rotor 202. Thus, the RPS 109 may be prevented from radially moving even if the EM rotor 202 radially moves.

Figure 3:
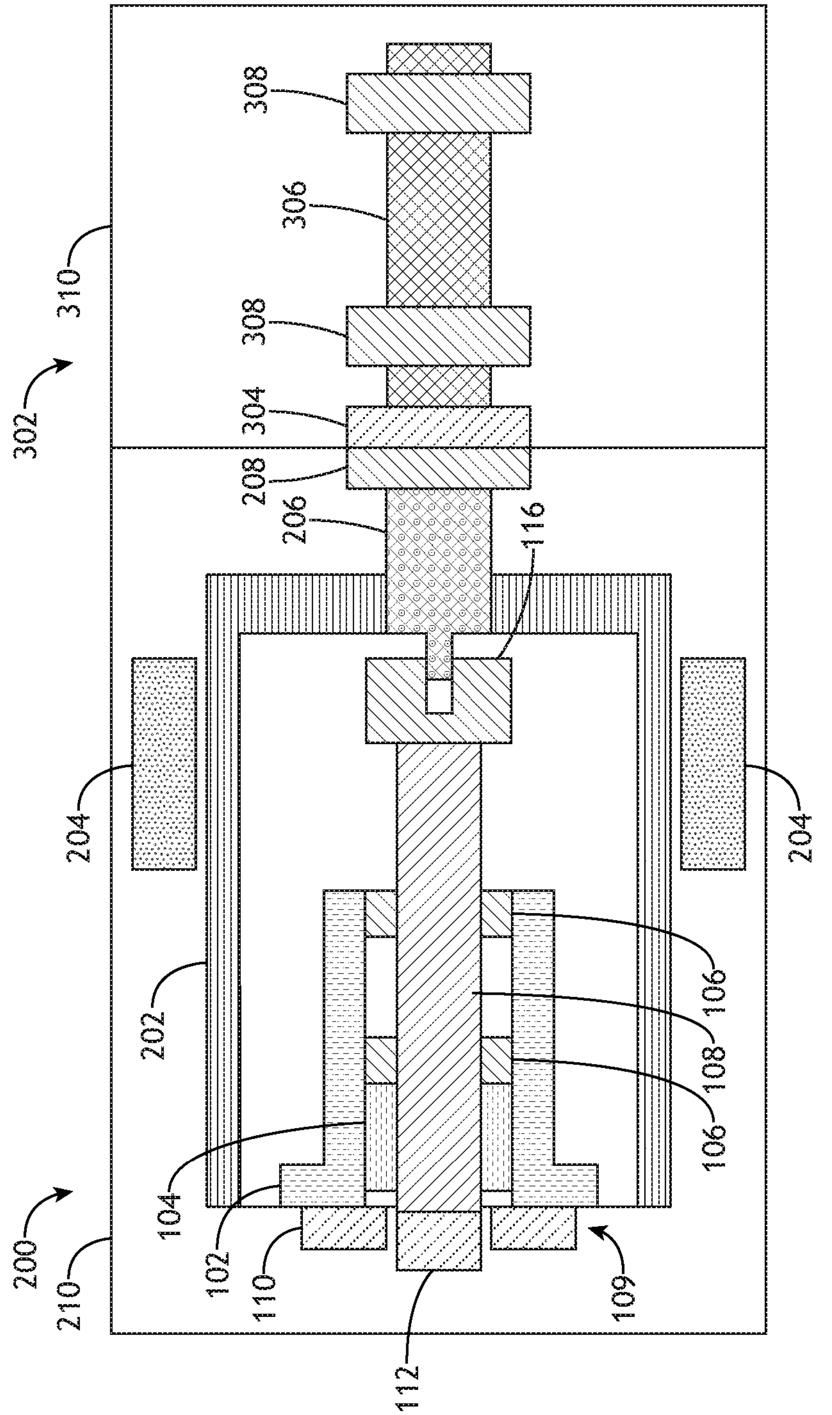
FIG. 3 illustrates a simplified block diagram of a drive-train system, in accordance with one or more embodiments of the present disclosure.

FIG. 3 illustrates a drive-train system 300, in accordance with one or more embodiments of the present disclosure. The drive-train system 300 may include one or more of the PTO 100, the electric motor 200, an external device 302 (ED), an ED flange 304, an ED shaft 306, ED bearings 308, and/or an ED housing 310.

The external device 302 may be considered external in that the external device 302 is external to the electric motor 200. The external device 302 may be an internal combustion engine. The external device 302 may include the ED flange 304, the ED shaft 306, the ED bearings 308, and/or the ED housing 310. The electric motor 200 may be a hybrid module which is bolted directly to the external device 302.

The ED flange 304 may be affixed to the EM flange 208. The EM flange 208 and/or the ED flange 304 may include a bolted interface by which the flanges are affixed. The EM flange 208 and the ED flange 304 may include matching bolt patterns. The EM flange 208 and/or the ED flange 304 may include centering features, such as but not limited to, dowels.

The ED shaft 306 may be a crankshaft or the like. The ED shaft 306 may be affixed to the ED flange 304.

The rotor shaft 206, the EM flange 208, the ED flange 304, and/or the ED shaft 306 may form a rigid body with zero degrees-of-freedom. The rotor shaft 206, the EM flange 208, the ED flange 304, and/or the ED shaft 306 may be configured to rotate as the rigid body. For example, rotation of the ED shaft 306 may rotate the rotor shaft 206, the EM flange 208, and/or the ED flange 304. The rotation of the rotor shaft 206 may cause rotation of the PTO rotor 104, the PTO shaft 108, the RPS rotor 112, and/or the EM rotor 202. The PTO rotor 104, the PTO shaft 108, the RPS rotor 112, the EM rotor 202, the rotor shaft 206, the EM flange 208, the ED flange 304, and/or the ED shaft 306 may rotate at a same RPM.

The PTO rotor 104, the PTO shaft 108, the RPS rotor 112, the EM rotor 202, the rotor shaft 206, the EM flange 208, the ED flange 304, and/or the ED shaft 306 may be coaxially aligned. The RPS rotor 112 and the ED shaft 306 may be disposed at opposing ends.

The ED bearings 308 may couple between the ED shaft 306 and the ED housing 310. The ED bearings 308 may locate the ED shaft 306 relative to the ED housing 310. The ED bearings 308 may constrain the ED shaft 306 to one degree-of-freedom. The ED shaft 306 may be configured to rotate relative to the ED housing 310. The ED bearings 308 may prevent radial translation and/or axial translation of the ED shaft 306 relative to the ED housing 310.

The EM rotor 202, the rotor shaft 206, the EM flange 208, the ED flange 304, and/or the ED shaft 306 may be supported by ED bearings 308. The EM rotor 202, the rotor shaft 206, the EM flange 208, the ED flange 304, and/or the ED shaft 306 through the ED flange 304 and the ED shaft 306. The ED bearings 308 may center the ED shaft 306. The ED bearings 308 may be crankshaft bearings, external device shaft (EDS) support bearings, or the like. The ED bearings 308 may also center the EM rotor 202 and the rotor shaft 206. The EM rotor 202 and the rotor shaft 206 may rely on the ED bearings 308 for centering the EM rotor 202 and the rotor shaft 206 on the EM stator 204. Thus, the ED bearings 308 may carry the weight of the EM rotor 202 and the rotor shaft 206 without the weight of the rotor shaft 206 being carried through the EM stator 204 and/or the EM housing 210. The RPS 109 may function properly in the drive-train system 300 even when the EM rotor 202 experiences radial misalignment.

The ED housing 310 may house one or more components of the external device 302. The ED flange 304, the ED shaft 306, and/or the ED bearing 308 may be housed within the ED housing 310.

The ED housing 310 may be affixed to the EM housing 210. The EM housing 210 and/or the ED housing 310 may include a bolted interface by which the housings are affixed. The EM housing 210 and/or the ED housing 310 may include centering features, such as but not limited to, dowels.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for applications.

LIST OF REFERENCE NUMBERS

100 PTO
102 PTO stator
104 PTO rotor
106 PTO bearing
108 PTO shaft
109 RPS
110 RPS stator
112 RPS rotor
114 Oil-Pump outlet
116 Shaft end
200 Electric motor
202 EM rotor
204 EM stator
206 Rotor shaft
208 EM flange
210 EM housing
212 Stator core
214 Windings
300 Drive-train system
302 External Device
304 ED flange
306 ED shaft
308 ED bearings
310 ED housing

What is claimed:

1. A power takeoff (PTO) comprising:
a PTO stator;
a PTO rotor axially aligned with, disposed radially inwards of, and configured to rotate relative to the PTO stator about a central axis;
a PTO bearing;
a PTO shaft affixed to the PTO rotor, the PTO bearing is axially aligned with and couples between the PTO shaft and the PTO stator; and
a rotor position sensor (RPS) comprising:
an RPS stator affixed to the PTO stator; and
a RPS rotor affixed to the PTO shaft, and configured to rotate relative to the RPS stator about the central axis, the RPS stator is configured to sense a rotary position of the RPS rotor, the PTO rotor is disposed axially between the RPS rotor and the PTO bearing.

2. The power takeoff of claim 1, wherein the RPS rotor and the PTO rotor are each affixed to a first end of the PTO shaft.

3. The power takeoff of claim 2, wherein the RPS rotor is affixed to the PTO shaft within an inner diameter of the PTO shaft.

4. The power takeoff of claim 1, wherein the PTO shaft is configured to axially translate relative to the PTO bearing.

5. The power takeoff of claim 1, wherein the RPS rotor is configured to axially translate relative to the RPS stator.

6. The power takeoff of claim 1, wherein the PTO bearing radially constrains the PTO shaft to the PTO stator.

7. The power takeoff of claim 6, wherein the PTO rotor, the PTO shaft, and the RPS rotor are coaxially aligned.

8. The power takeoff of claim 7, wherein the PTO rotor, the PTO shaft, and the RPS rotor form a rigid body.

9. The power takeoff of claim 8, wherein the PTO rotor, the PTO shaft, and the RPS rotor are configured to rotate relative to the PTO stator and the RPS stator.

10. The power takeoff of claim 9, wherein the PTO rotor, the PTO shaft, and the RPS rotor are configured to axially translate relative to the PTO stator and the RPS stator.

11. The power takeoff of claim 10, wherein the rotor position sensor is configured to sense a rotary position of the PTO rotor, the PTO shaft, and the RPS rotor.

12. The power takeoff of claim 1, wherein the power takeoff is an oil-pump PTO, wherein the PTO stator defines an oil-pump outlet, wherein rotation of the PTO rotor causes oil to be pumped from the oil-pump outlet.

13. An electric motor (EM) comprising:
a power takeoff (PTO) comprising:
a PTO stator;
a PTO rotor is axially aligned with, disposed radially inwards of, and configured to rotate relative to the PTO stator about a central axis;
a PTO bearing;
a PTO shaft affixed to the PTO rotor, the PTO bearing is axially aligned with and couples between the PTO shaft and the PTO stator; and
a rotor position sensor (RPS) comprising:
an RPS stator affixed to the PTO stator; and
a RPS rotor affixed to the PTO shaft, and configured to rotate relative to the RPS stator about the central axis, the RPS stator is configured to sense a rotary position of the RPS rotor, the PTO rotor is disposed axially between the RPS rotor and the PTO bearing;

an EM rotor;

an EM stator configured to induce a magnetic field, causing the EM rotor to rotate relative to the EM stator;

a rotor shaft, mechanically coupled to the rotor shaft, the EM rotor is affixed to the rotor shaft;

an EM flange affixed to the rotor shaft, the PTO rotor, the RPS rotor, the PTO shaft, the EM rotor, the rotor shaft, and the EM flange are configured to rotate together about the central axis; and an EM housing, the PTO stator and the EM stator are affixed to the EM housing.

14. The electric motor of claim 13, wherein an outer radius of the rotor shaft is affixed to an inner radius of the EM rotor.

15. The electric motor of claim 13, wherein the PTO rotor, the PTO shaft, and the RPS rotor form a rigid body.

16. The electric motor of claim 15, wherein the PTO rotor, the PTO shaft, and the RPS rotor are configured to axially translate relative to the rotor shaft.

17. The electric motor of claim 13, wherein the PTO shaft and the EM flange are disposed at opposing ends of the rotor shaft.

18. The electric motor of claim 13, wherein the electric motor is a three-phase electric motor.

19. The electric motor of claim 13, wherein the electric motor does not comprise a bearing coupling the EM rotor to the EM stator.

20. A drive-train system comprising:

an electric motor comprising:

a power takeoff (PTO) comprising:

a PTO stator;

a PTO rotor, axially aligned with, disposed radially inwards of, and configured to rotate relative to the PTO stator about a central axis;

a PTO bearing;

a PTO shaft affixed to the PTO rotor, the PTO bearing is axially aligned with and couples between the PTO shaft and the PTO stator; and a rotor position sensor (RPS) comprising:

an RPS stator affixed to the PTO stator; and a RPS rotor affixed to the PTO shaft and configured to rotate relative to the RPS stator about the central axis, the RPS stator is configured to sense a rotary position of the RPS rotor, the PTO rotor is disposed axially between the RPS rotor and the PTO bearing;

an EM rotor;

an EM stator, configured to induce a magnetic field causing the EM rotor to rotate relative to the EM stator;

a rotor shaft, the PTO shaft is mechanically coupled to the rotor shaft, the EM rotor is affixed to the rotor shaft;

an EM flange affixed to the rotor shaft, the PTO rotor, the RPS rotor, the PTO shaft, the EM rotor, the rotor shaft, and the EM flange are configured to rotate together about the central axis; and an EM housing the PTO stator and the EM stator are affixed to the EM housing; and an external device (ED) comprising:

an ED flange, the EM flange is affixed to the ED flange;

an ED shaft, the ED shaft is affixed to the ED flange, the rotor shaft, the EM flange, the ED flange, and the ED shaft form a rigid body;

a plurality of ED bearings; and an ED housing, the EM housing is affixed to the ED housing, the plurality of ED bearings couple between the ED shaft and the ED housing.

* * * * *